US005428526A

United States Patent [19]
Flood et al.

[11] Patent Number: 5,428,526
[45] Date of Patent: Jun. 27, 1995

[54] PROGRAMMABLE CONTROLLER WITH TIME PERIODIC COMMUNICATION

[76] Inventors: Mark A. Flood, 1330 Worton Blvd., Mayfield Heights, Ohio 44124; Clay T. White, 26151 Lakeshore Blvd., #1220, Euclid, Ohio 44132

[21] Appl. No.: 12,683

[22] Filed: Feb. 3, 1993

[51] Int. Cl.⁶ .............................................. G05B 11/01
[52] U.S. Cl. ..................................... 364/141; 364/143; 364/145
[58] Field of Search ............... 364/140, 141, 143, 145, 364/131, 569; 395/325, 550, 775; 340/309.15

[56] References Cited

U.S. PATENT DOCUMENTS

| | | | |
|---|---|---|---|
| 3,808,612 | 5/1974 | Boyle et al. | 4/239 |
| 3,813,649 | 5/1974 | Struger et al. | 395/275 |
| 4,070,702 | 1/1978 | Grant et al. | 395/275 |
| 4,279,012 | 7/1981 | Beckedorff et al. | 364/145 |
| 4,570,216 | 2/1986 | Chan | 364/143 |
| 4,797,820 | 1/1989 | Wilson et al. | 364/420 |
| 4,799,142 | 1/1989 | Waltzer et al. | 364/143 |
| 4,825,352 | 4/1989 | Iijima et al. | 364/140 |
| 4,847,782 | 7/1989 | Brown, Jr. et al. | 364/492 |
| 4,858,101 | 8/1989 | Stewart et al. | 364/141 |
| 5,095,425 | 3/1992 | Hesse | 395/350 |
| 5,224,095 | 6/1993 | Woest et al. | 340/825.08 |

Primary Examiner—Paul Gordon
Attorney, Agent, or Firm—Mark Pfeiffer; John J. Horn; H. Fred Hamann

[57] ABSTRACT

A communication module has a backplane interface circuit that enables the module to communicate with other components of the programmable controller, and has a network interface circuit which sends and receives messages via a serial communication link. A memory within the module stores a designation of a starting time, a designation of a length of a message repeat interval, and a file of message information. A clock circuit determines when the starting time occurs and thereafter determines the expiration of each successive occurrence of the message repeat period. A control mechanism responds to the clock circuit determining an occurrence of the starting time or determining an expiration of a message repeat interval, by operating network interface circuit to transmit a message, that contains the message information, over the serial communication link.

6 Claims, 7 Drawing Sheets

FIG. 7 COMMUNICATION MODULE

PROGRAMMABLE CONTROLLER WITH TIME PERIODIC COMMUNICATION

The present invention relates to programmable controllers for operating industrial equipment, such as the one described in U.S. Pat. No. 4,858,101; and more specifically to the exchange of information among programmable controllers.

BACKGROUND OF THE INVENTION

Programmable controllers are a common type of industrial computer for operating a wide variety of manufacturing equipment, such as assembly lines and machine tools, in accordance with a stored program. The program comprises a series of process control instructions which are read out and executed to examine the state of selected sensing devices on the controlled equipment, and to energize or deenergize selected operating devices contingent upon the state of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. Additional program instructions perform arithmetic operations, timing and counting functions, and complex statistical reporting operations. Such instructions have become quite standardized in the industry and are directly associated with the elements of a ladder logic diagram which is easily understood by process control engineers. Program panels such as those described in U.S. Pat. Nos. 3,808,612; 3,813,649 and 4,070,702 have been developed to assist the user in developing and editing ladder logic control programs comprised of such programmable controller instructions.

An assembly line typically is controlled by a number of programmable controllers. In which case, serial communication networks also interconnect the programmable controllers allowing them to exchange data regarding the operation of the assembly line. In addition, a central computer for the factory often is coupled to the network to receive assembly line status information from the programmable controllers and issue commands to them. In such installations, the programmable controllers periodically forward productivity information to the central computer. For example, at the end of every work shift in the factory the central computer gathers the productivity information from the programmable controllers for each assembly line and produces a production report for that work shift.

In order for a given programmable controller to send information at a particular time or at specified intervals, communication message commands heretofore had to be placed in the control program that was executed to control the associated section of the assembly line. For example, rungs had to be added to a ladder logic program to initialize a timer for the interval between message transmissions and to transmit the message when the timer interval elapses. The execution of the message handling rung took processing time away from the primary machine control function of the programmable controller. In some applications this could adversely affect the control function, especially when time critical processes were being controlled.

A complex process often is defined by a plurality of ladder logic control programs that are executed at different times in a sequence specified by a sequential function chart that is interpreted by the programmable controller. U.S. Pat. No. 4,858,101 describes the use of a sequential function chart. This operation further complicates periodic message transmission, since a different ladder logic program than the one with the message rung may be executing when it is time to send the message. In fact, it may be some time thereafter before the sequential function chart cycles to a point at which the particular ladder logic program with the message control rung is executed. This not only delays the transmission of the message, the message data that ultimately is sent represents the status of the programmable controller at that latter time rather than when the message should have been sent. Thus if a number of programmable controllers are to provide status reports to the central computer at the same instant in time, the delay in executing the communication instruction can result in reports from different programmable controller representing the state of the manufacturing equipment at different points in time.

SUMMARY OF THE INVENTION

A general object of the present invention is to provide communication module for a programmable controller which module has sufficient intelligence to periodically transmit a specified message over a communication network. Thus the communication module assumes responsibility for the transmission of that message, relieving the processor module of the programmable controller from that responsibility. This enables the processor module to devote more time to the primary task of executing a machine control program and the execution of the a machine control program does not affect the timely transmission of the message.

This object is accomplished by a communication module that includes a controller interface circuit that connects to a set of busses that extend to other modules of the programmable controller in order to exchange signals with those modules. A network interface circuit sends and receives messages via a serial communication network. The communication module includes a memory that stores a designation of a starting time, a designation of a length of a message repeat interval, and message information. The controller interface circuit, memory, and network interface circuit are connected to a group of data, address and control buses.

A timing circuit connects to said memory and determines when the starting time has occurred. Thereafter, the timing circuit determines each successive occurrence of the message repeat interval. In the preferred embodiment that timing circuit comprises a means which indicates the time of day and a means for calculating a time at which to send a message. That calculation adds the length of the message repeat interval to the time of day to produce a value designated NEXT TIME. The value of NEXT TIME is compared to the time of day which comparison determines when to send a message. A control mechanism responds to those determinations of the timing circuit by operating the network interface circuit to form a message containing the message information and transmit the message over the serial communication network.

Another object of the present invention is to provide a mechanism by which the communication module, at defined times during the day, requests data from one or more devices connected to the communication network.

A further object is to provide a mechanism by which the communication module, at defined times during the day, automatically sends a set of data to a device connected to the communication network.

Still another object of the present invention is to provide a programming apparatus by which a user of the programmable controller is able to define the times at which the communication module sends the messages and to define the contents of those messages.

BRIEF DESCRIPTION OF THE DRAWINGS

FIG. 13 is a time line of an exemplary time periodic communication operation.

DETAILED DESCRIPTION OF THE INVENTION

Figure 1:
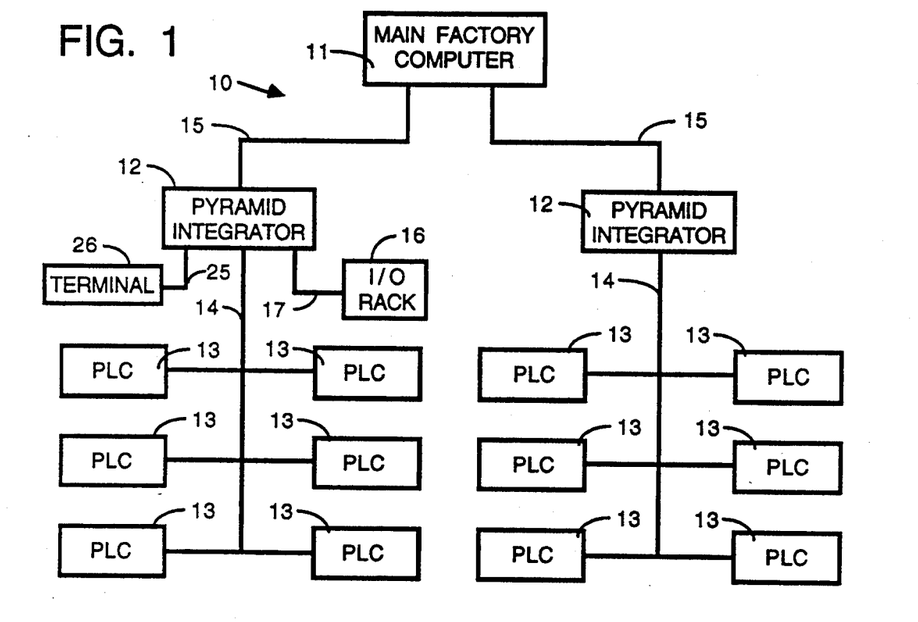
FIG. 1 is a schematic representation of an industrial control system that includes a central computer, a pair of pyramid integrators and a plurality of programmable controllers.

With initial reference to FIG. 1, a factory control system 10 has a plurality of machine controllers connected by communication links 15 to a main factory computer 11. Specifically the machinery in the factory is operated by a series of programmable controllers (PLC's) 13 that are connected to a pair of pyramid integrators 12 by serial communication networks 14. The exemplary factory has two assembly lines with each serial communication network 14 interconnecting the programmable controllers 13 along one of the assembly lines. One kind of programmable controller which can be employed is described in U.S. Pat. No. 5,212,631 issued May 18, 1993 which is incorporated herein by reference.

The pair of pyramid integrators 12 gather data from the programmable controllers 13 and send reports to the main factory computer 11. The pyramid integrators 12 may be a type of programmable controller designed for that function, such as the one described in U.S. Pat. No. 4,858,101 which description is incorporated herein by reference.

Figure 2:
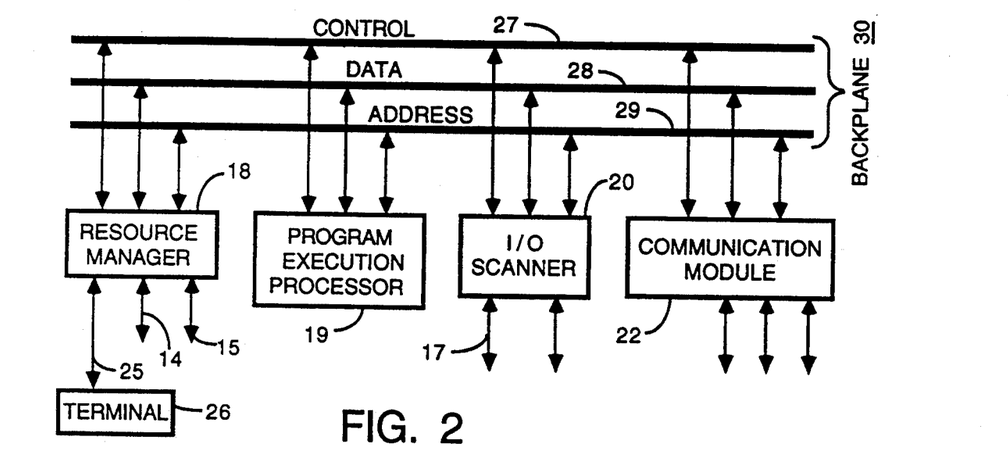
FIG. 2 is a schematic diagram of the interconnection of functional modules in each pyramid integrator.

With reference to FIG. 2, each pyramid integrator 12 is housed in rack which has a power supply and a series of slots that receive a plurality of functional modules. A mother board extends across the back of the rack and forms a backplane 30 having a series of signal buses and power supply lines to which the modules connect. The backplane has a set of control lines 27, a parallel data bus 28 and a parallel address bus 29. The pyramid integrator functional modules include a resource manager module 18, at least one processor module 19, and optionally a remote input/output (I/O) scanner module 20. Although the resource manager module 18 has ports to which serial communication networks 14 and 15 connect, a separate communication module 22 can be provided in installations requiring connection to additional networks. Therefore, both the resource manager module 18 and the communication module 22 generically can be referred to as a communication module. Additional modules may be included as the need arises.

The optional remote I/O scanner module 20 interfaces the pyramid integrator 12 to one or more remote I/O racks 16 via a serial data link 17 (shown in FIG. 1) when there is a need to exchange I/O data directly with the pyramid integrator. Each remote I/O rack 16 has a plurality of I/O modules which are coupled to sensor and actuators (not shown) on the machinery being controlled. The I/O modules are conventional in design providing D.C. inputs or outputs, A.C. inputs or outputs, analog inputs or outputs, and open or closed loop positioning modules, for example.

The resource manager module 18 of one pyramid integrator 12 is shown connected by a cable 25 to a programming terminal 26. Terminal 26 is a personal computer on which the user develops control programs, which then are loaded into pyramid integrater 12. The terminal 26 also is used to configure the programmable controller and monitor system performance. As will be described in detail hereinafter, the terminal 26 also is used to configure the time periodic communication function performed by the resource manager module 18. The terminal 26 can also be connected to the communication module 22 in order to configure that module to perform the time periodic communication function. When no longer required, the terminal 26 can be disconnected from the pyramid integrator 12.

Figure 3:
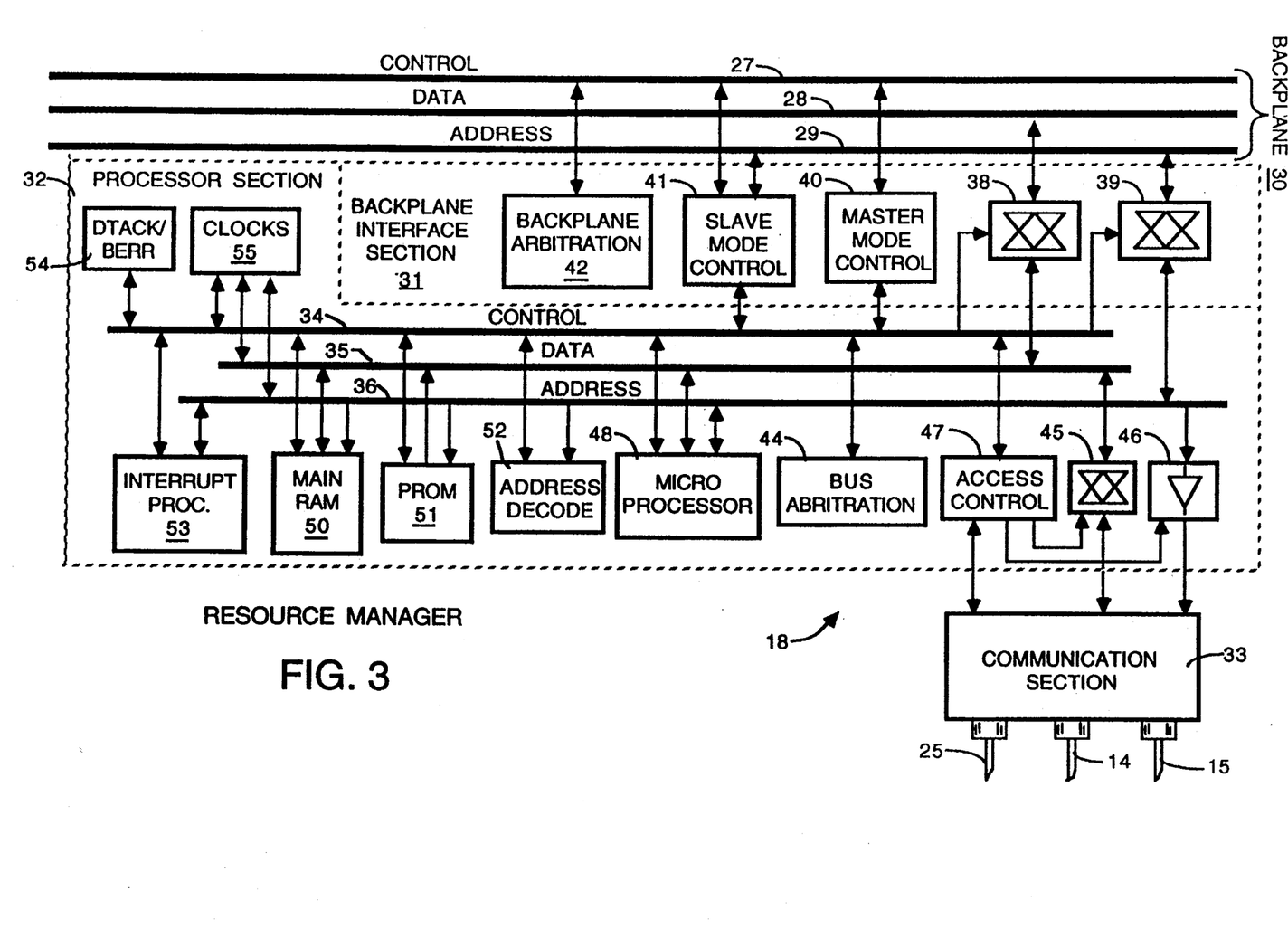
FIG. 3 is a schematic diagram of a resource manager module in each pyramid integrator.

The circuitry of the resource manager module 18 is shown schematically in FIG. 3 and is divided into three sections 31, 32 and 33 for backplane interface, processing and communication functions, respectively. The backplane interface section 31 supervises access to the rack backplane 30 by all the rack modules and connects the resource manager module 18 to the backplane 30. The processor section 32 executes a supervisory program for the pyramid integrator 12 and the communication section 33 is primarily responsible for communicating with the programming terminal 26 and via communication networks 14 and 15.

The processor section 32 is linked together by a set of buses that comprise control lines 34, a sixteen bit wide data bus 35 and a parallel address bus 36. The backplane interface section 31 interfaces the processor section buses 34–36 to the backplane buses 27–29. Specifically, the backplane data bus 28 is connected to the processor section data bus 35 by a set of bidirectional data transmission gates 38 and the backplane address bus 29 is connected to the processor section address bus 36 by another set of bidirectional gates 39. When the resource manager module 18 seeks to exercise control over the backplane 30, a master mode control circuit 40 responds to signals on the control lines of the processor section bus 34 and issues the proper control signals over the backplane control bus 27 to access other modules within the rack.

When another module within the pyramid integrator 12 seeks to access to the resource manager module 18, the resource manager module becomes subordinate to the control of the backplane 30 by that other module. In this circumstance, a slave mode control circuit 41 within the resource manager module 18 responds to signals carried on the backplane address bus 29 and on the control lines of the backplane bus 27 which lead from the other module. The slave mode control 41 responds by issuing signals to transmission gates 38 and 39 enabling the other backplane module to access the resource manager module 18. In this latter instance, the master mode control circuit 40 is in a dormant state. Bus gates 38 and 39 receive enabling control signals from the master or slave mode control circuits 40 and 41 via the lines of control bus 34 depending upon the mode of backplane communication. A conventional backplane arbitration circuit 42 supervises access to the backplane 30 and resolves conflicting requests for access from the modules in the system.

Another arbitration circuit 44 governs access to the processor section buses 34–36. Two sets of signal gates 45 and 46 extend between the processor section buses 35 and 36, respectively, and the communication section 33. Specifically, the first set of gates 45 provides a bidirectional data connection between these sections and the second set of gates 46 provides a path for the address signals. An access control circuit 47 responds to access request signals from the processor and communication sections 32 and 33 by enabling the data and address gates 45 and 46.

The processor section 32 is built around a microprocessor 48 which executes program instructions stored in a programmable read only memory (PROM) 51. The microprocessor 48 is essentially a memory mapped device and does not have any input/output lines directly connected to it. Therefore, its access to other components on the processor bus must be accomplished through issuing addresses on bus 36. The address sent from the microprocessor 48 is decoded in an address decode circuit 52 to produce the proper control signals for the accessed component via control bus 34. The processor section 32 also contains an interrupt processor 53 which controls interrupts to the microprocessor 48.

A data transfer acknowledge and bus error (DTACK/BERR) circuit 54 is also connected to the processor control bus 34. Circuit 54 responds to signals from the various components in the processor section 32 to acknowledge the completion of a data transfer and issue bus error signals in the event of improper addressing or failure of data transfer. These signals are acted on by the microprocessor 48 to take corrective action. The processor section 32 also includes clock circuit 55 that contains the main system clock and a real time clock.

The main random access memory (RAM) 50 for the resource manager module 18 also is connected to the processor buses 35–36. The RAM 50 is a memory containing sixteen-bit wide storage locations, and serves as the system memory for the entire pyramid integrator 12. The system RAM 50 can be directly accessed via the backplane 30 by other modules in the rack without the intervention of the microprocessor 48 within the resource manager module 18. The main RAM 50 stores configuration data provided by the user via terminal 26, as well as other data that is shared by several functional modules.

Figure 4:
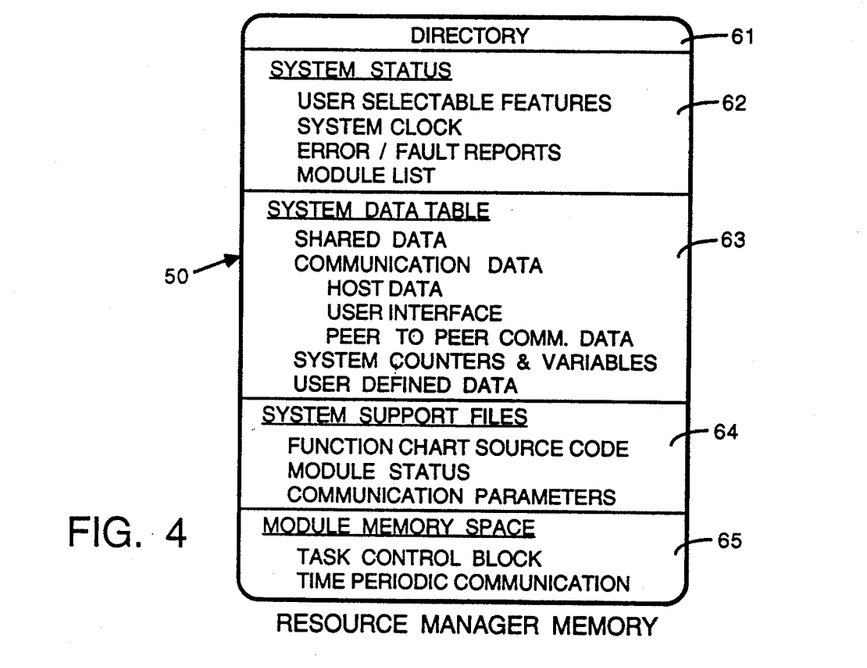
FIG. 4 is a memory map of a shared system memory in the resource manager module.

FIG. 4 illustrates the data structures within the main system memory 50 of the resource manager module 18. The main system memory 50 stores separate data files, which contain data for performing specific functions during the operation of the pyramid integrator 12. The data structures include various forms of data such as integers, floating point numbers, ASCII characters, and various control structures. The first file 61 is a directory of the other files stored in the main system memory 50. The remaining memory is divided into a system status file 62, system data table 63 and a set of system support files 64.

The system status file 62 contains data relating to the configuration of the entire pyramid integrator 12. Included in this file 62 is information identifying the various user selectable features that have been enabled by the system operator. The real time clock data regarding the time of day, month, day and year are also included in this portion of the system memory and can be read by other modules 19–22 via backplane 30. Digital words indicating the occurrence and type of various system faults and errors, as well as pointers indicating the program instruction being executed when the fault occurs are stored within another sub-file of this section. A section of the system status file 62 also lists the number and type of all the active modules in the pyramid integrator 12 and remote I/O rack 16, as well as the relative module number and address pointers necessary to access each module. For example, if more than one program processor module 19 or remote I/O scanner module 20 is present in the pyramid integrator 12, the user must assign a unique number by a thumb wheel on the module to distinguish the various modules of that type. The thumb wheel setting is read by the resource manager module 18 during initial start-up of the system and stored in this portion of the system status file 62.

The system data table 63 contains data that is shared by more than one module. For example, results of various computations from one processor module 19 may be stored in this portion of the system memory so that other program processor modules may readily access the data. Memory space is allocated within the system data table 63 to store the data that was received or that will be transmitted via the various external communication links of the resource manager module's communication section. Other modules in the pyramid integrator 12 are directly able to access these storage locations.

The system data table 63 also contains the value of various system counters and variables which are either used by the resource manager module 18 or which are commonly used by a number of other modules such as processor modules 19 or the I/O scanner modules 20. The final sub-file within the system data table 63 is a space allocated for the user defined data for various programs that the user has loaded into the programmable controller.

The final section 64 of the main system memory 50 is dedicated to the system support files. These files include the source code information for the function chart program. Although the local memory in each module contains data regarding its status, in some instances these memories do not have a battery to sustain them. In order to retain such volatile information after a power shut-down, the status information for these modules is replicated in a sub-file of section 64 of the system memory 50.

Communication parameters are also stored in section 64 to configure the communication section 33 of the resource manager module 18. Among other things these parameters include baud rate, word size and control bits for the serial data signal format. For example, parameters for communicating with the programming terminal 26 are stored in this portion of the system memory as well as for communicating with the programmable controllers 13 via local area network 14.

Section 65 of the resource manager's RAM 50 contains data for use only by that module 18. This data includes task control blocks similar to those used in previous programmable controls to identify which tasks are awaiting execution by the module's microprocessor 48. Data for the timed periodic communication function is also stored in section 65 as will be elaborated upon.

The communication section 33 interfaces pyramid integrator 12 to the serial communication link 25 for the terminal 26 and local area networks which are connected to ports 14 and 15 of the resource manager module 18. The communication section 33 includes drivers for serial signal standards, such as RS232, RS423 or RS422. In addition the communication section 33 provides intelligence for the pyramid integrator 12 to exchange messages according to the communication protocols used by networks 14 and 15. The details of this section of the resource manager module 18 are similar to those of the communication module 22 which will be described subsequently.

The resource manager module 18 executes operating system programs which control the initialization of the pyramid integrator 12 and the external communication interface. The resource manager module 18 does not execute the user defined control program which operates the equipment being controlled; that is tile function of the program execution processor module or modules 19. However, as will be described, the resource manager module 18 can be programmed by the system operator to send messages on a time periodic basis.

The program execution processor module 19 stores and executes user control programs, such as ladder logic programs. During this execution, the modules 19 read the state of the sensing devices from input image tables in the respective memories of the various I/O scanner modules 20, and write output data from its memory to the output image tables in the I/O scanner modules. Data is also obtained from the system memory 50 in the resource manager module 18.

Figure 5:
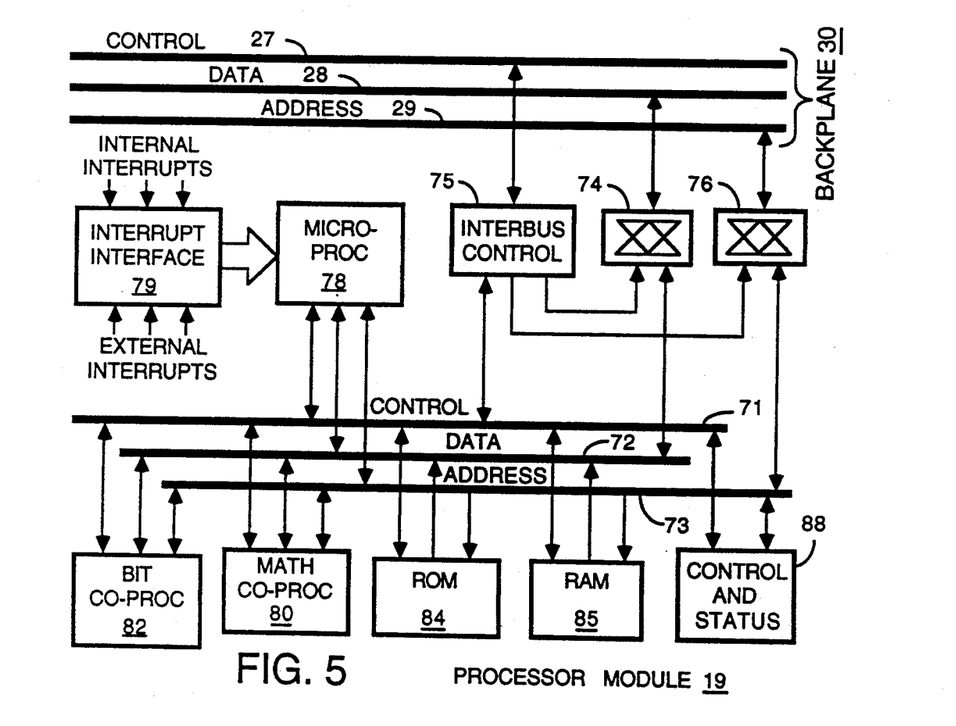
FIG. 5 is a schematic diagram of a control program processor module in each pyramid integrator.

In order to perform these tasks, the processor module 19 has a set of internal buses 71-73 which are coupled to the backplane 30 as shown in FIG. 5. Specifically, the processor module 19 has a thirty-two bit internal data bus 72, a set of control lines 71 and an address bus 73. These are coupled to the data and address buses of the backplane 30 by sets of tri-state, bidirectional transmission gates 74 and 76, respectively. The operation of these sets of gates 74 and 76 is governed by an interbus control circuit 75 coupled to backplane control lines 27 and the module control lines 71.

The remaining components of the processor module 19 are connected to the internal buses 71-73. These internal buses are connected to a microprocessor 78, which has an interrupt port which is coupled to an interrupt interface circuit 79. This interface circuit receives signals from four external interrupt lines connected to terminals on the front of the processor module 19 and from circuits within the processor module 19.

The processing capability of the processor module 19 also is supported by a conventional math co-processor 80, and by a bit co-processor 82. The bit co-processor 82 is a custom integrated circuit for carrying out Boolean logic operations on individual bits of the data words similar to such circuits used in previous programmable controllers. The three processor circuits 78, 80 and 82 cooperate to execute specific types of instructions included in the control program. The microprocessor 78 may begin execution of the control program and when it encounters a floating point arithmetic function, the math co-processor 80 is enabled to take over the processing function until the arithmetic operation is complete at which time the microprocessor 78 resumes program execution. If the control program calls for single data bit processing, the microprocessor relinquishes control to the bit co-processor 82 until another instruction for the microprocessor 78 is encountered.

Both a read only memory (ROM) 84 and a read-write random access memory (RAM) 85 are connected to all three internal buses 71-73 within the processor module 19. The ROM 84 contains storage locations for instructions and constants for the three processor circuits 78, 80 and 82. The RAM 85 provides storage for the operands and the results of the various computations performed by the processor module 19. The user defined control programs to be executed by the module 19 are also contained in its RAM 85.

Figure 6:
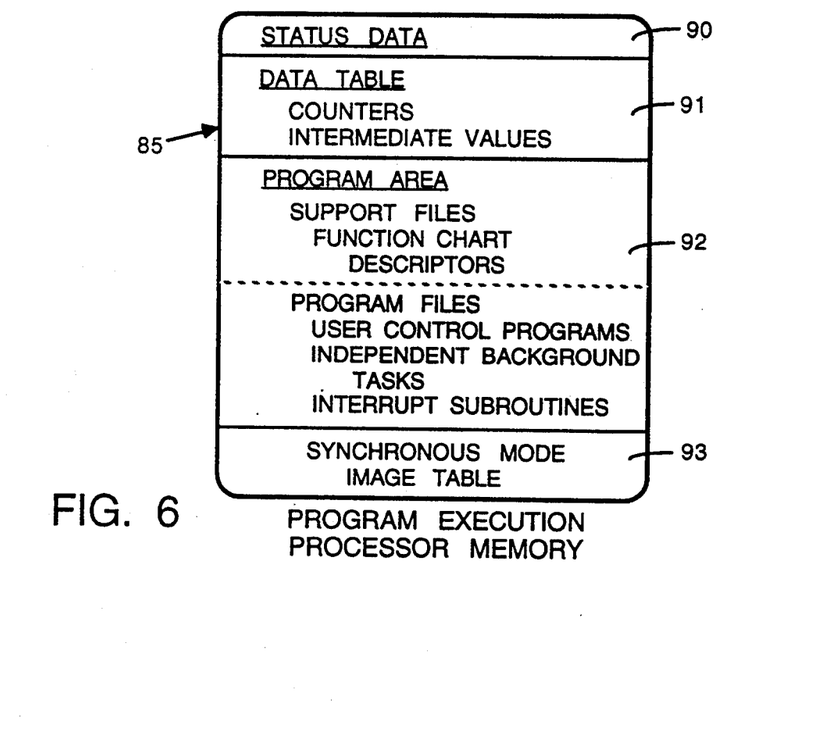
FIG. 6 is a memory map of the memory contained in the control program processor module.

FIG. 6 depicts the data structure of the RAM 85 in the processor module 19. The memory 85 includes a section 90 which contains status information regarding the module's operation. Each program execution processor module 19 also contains its own data table 91 which is stored in the RAM 85. The data table 91 includes memory locations for various counters, timers and intermediate computation values. The largest share of the RAM 85 is devoted to storing the control programs. The programs comprise compiled control programs, independent background tasks and various interrupt routines to be run by the processor modules 19. To properly carry out the control programs, support files containing the function chart data, called "descriptors," are also contained within the program area 92. In one mode of operation referred to herein as the "synchronous mode", the processor module 19 periodically copies the entire input image table from the I/O scanner module 20 into its own memory 85. Space for this copy of the I/O image table is provided in memory section 93.

The final component of the processor module 19 is a control and status circuit 88 which monitors the status of the processor module 19 and provides proper control signals on various lines of the control bus 71 to enable various components in a conventional manner. As noted, the I/O scanner modules 20 handle the transfer of data from the processor modules 19 to the I/O modules in the remote I/O racks 16.

Referring again to FIGS. 1 and 2, a remote I/O scanner module 20 couples the pyramid integrator 12 to remote input/output rack 16 that contains individual I/O modules which interface the sensors, or input devices, and actuators, or output devices, to the programmable controller. The scanner module 20 periodically requests input data pertaining to the status of the input devices connected to the remote I/O rack 16 and stores it in the module's input image table for reading by other controller modules, such as the processor module 19. The scanner module 20 also contains an image table of output data received from the processor module 19. At regular intervals, the updated output data in the scanner module's output image table is transferred to the remote I/O rack 16 to control the various actuators connected to that rack. The details of the I/O scanner module are described in U.S. Pat. No. 4,858,101.

When the pyramid integrator 12 has to be connected to a greater number of communication links than can be connected to the resource manager module 18, a separate communication module 22 is included to handle the excess links. The circuitry of the communication module 22 is similar to the communication section 33 of the resource manager module 18 except that the communication module 22 connects directly to the backplane 30 of the pyramid integrator 12.

Figure 7:
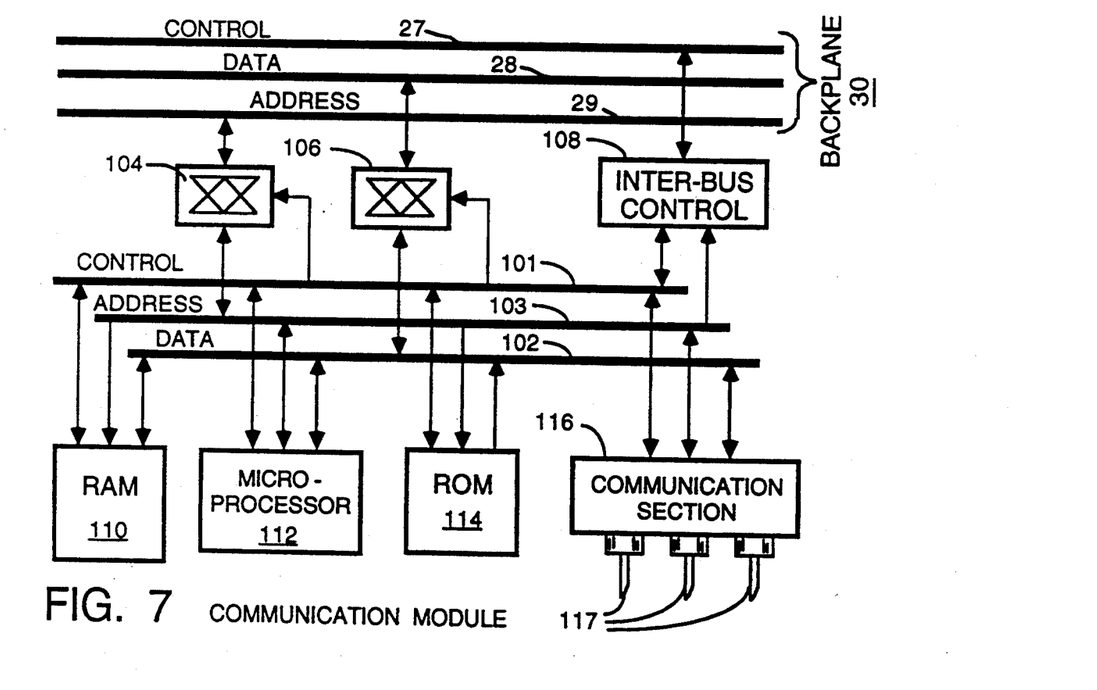
FIG. 7 is a schematic diagram of an optional communication module in each pyramid integrator.

Referring specifically to FIG. 7, the communication module 22 contains a set of internal buses 101-103 connected to the three backplane buses 27-29 by a set of bi-directional address bus gates 104 and a set of bi-directional data bus gates 106. Both sets of gates 104 and 106 are controlled by an inter-bus control circuit 108 which sends signals to the gates via the control bus 101. A local random access memory, referred to as RAM 110, is coupled to the three internal buses 101-103. This memory 110 stores the input image table for the sensor information being input to the I/O scanner 20 from the remote I/O rack 16 and also stores the output image table for the output data being output to the remote I/O rack.

The microprocessor 112 in the communication module 22 executes a firmware program stored in a ROM 114. This program obtains outgoing message data stored in RAM 110 and formats the data into a message frame for transmission via communication links 117 connected to the communication section 116. Similarly the program executed by the microprocessor 112 retrieves data in messages received by the communication section 116 from the communication links 117. The retrieved data is placed into the RAM 110 and subsequently forwarded to the appropriate module 17-20 when the communication module 22 is granted access to the backplane 30.

The present invention provides a mechanism by which the resource manager module 18 or the communication module 22 can be programmed to transmit messages on a time periodic basis, thereby relieving the program execution processor module 19 from that responsibility and freeing that module to devote its processing time to the execution of the user control program. In order to understand how the time periodic program is executed, the basic understanding of how each of these modules executes different programs would be beneficial. For simplicity, this process will be described with respect to the resource manager module 18 with the understanding that the components of the communication module 22 operate in a similar fashion.

With reference to the resource manager in FIG. 3, the programs which direct the microprocessor 48 through the tasks to be performed are arranged in modules, each of which comprises one or more routines or subroutines. In the case of the resource manager module 18, some of these routines are directed toward communication tasks which exchange data over the different communication links 14, 15 and 25. Other routines are directed toward the functions that relate to the management of the pyramid integrator 12. For example, one such task involves the initialization of the pyramid integrator 12 upon power up.

Figure 8:
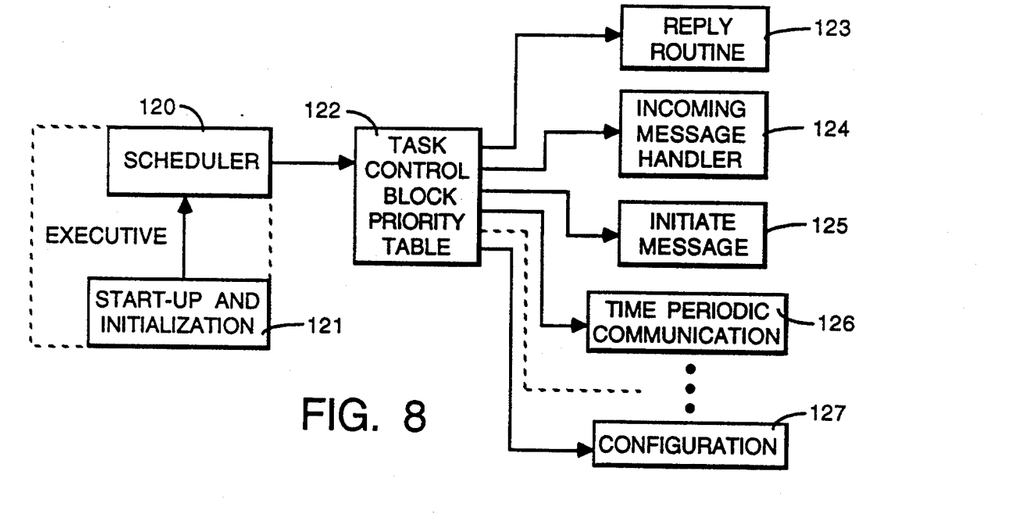
FIG. 8 is a block diagram of the resource manager module software system and specifically to the sections of that system which handle communication tasks.
Figure 9:
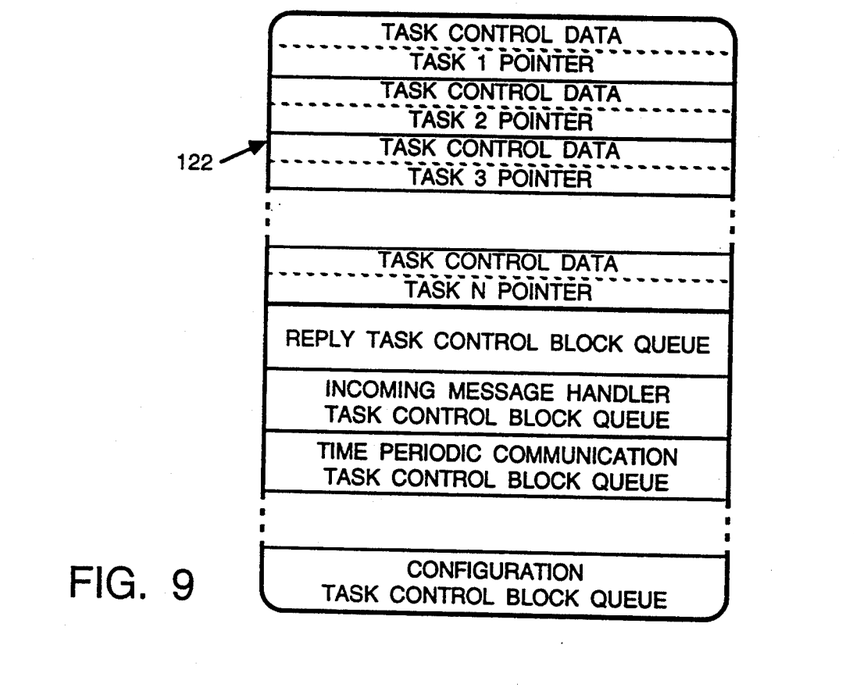
FIG. 9 is a map of a portion of the random access memory in the resource manager module of FIG. 3.

Referring to FIGS. 8 and 9, a scheduler routine 120 determines which task awaiting execution has the highest priority by referring to a task control block priority table 122. This table 122 is stored in the RAM 50 of the resource manager module 18 and for each of a number of different tasks 123-127 in the module, task control data and a stack pointer are stored. The order in which these task entries are arranged in priority table 122 determines the priority of the task and the scheduler routine 120 operates to examine each task control block in order to determine the highest priority task which is ready to run. This type of task control priority table has been used in previous programmable controllers. The task control data indicates whether a task at that level is waiting to be run and the task pointer indicates a location within the table in which a queue of the tasks at that level is stored. The queue holds a series of task control blocks (TCB), each of which contains data that configures the task for a particular function to be performed. The use of such task control blocks will be described in the context of the present invention which implements a time periodic message communication function. When one task has completed and there are no other tasks at that priority level, the scheduler 120 goes to the next highest task within the priority table 122 that is awaiting execution.

These tasks are initiated at power up and do not terminate. Instead, a task may suspend itself and wait for an event to occur before continuing or it may be interrupted and re-entered after the interrupt is serviced. When the interrupts are not being serviced, a task can be executed and it is the function of the scheduler routine 120 to determine which task has the highest priority. The scheduler routine 120 is entered after a start up and initialization routine 121 is executed and from that point on, the scheduler routine 120 is entered in response to a software initiated interrupt. This interrupt has the lowest priority. It is thus possible for any program in the resource manager module 18 to call the scheduler routine 120 by executing this interrupt instruction.

With respect to the communication functions, the first task 123 processes an incoming message received by the communication section 33 from one of the communication links 14, 15 or 25 and forwards the data or command in that message to the appropriate module in the pyramid integrator 12. This task is executed by the microprocessor 48 in response to an interrupt generated by the communication section 33. Another task 124 formulates a reply to an incoming message acknowledging its safe receipt to the message originator. Task 124 initiates the transmission of messages from the resource manager module 18 by placing data defining the message into a queue for the communication section 33.

As noted, one of the tasks which is performed by the microprocessor 48 within the resource manager module 18 (or the communication module 22) is the time periodic communication (TPC) task 126. This task 126 enables the resource manager module 18 to be configured so that on a periodic basis, a defined message is transmitted which serves to either gather data from another device on one of the communication networks or transmit data to such other device. For example, at the end of a work shift, a separate TPC message may be configured for each of the programmable controllers 13 on network 14 connected to the pyramid integrator 12. Each of these messages requests that specific data be transmitted from the programmable controller 13 to the pyramid integrator 12. The pyramid integrator 12 accumulates the data gathered from the programmable controllers 13 and another TPC function transmits the accumulated data to the main factory computer 11 via communication network 15.

A TPC function is configured by the system operator utilizing programming terminal 26 which is connected to either the resource manager module 18 or the communication module 22 that is to carry out that function. With the understanding that the following description applies to both of these modules 18 or 22, the TPC function will be explained in the context of the resource manager module 18, in order to simplify the description.

To initiate TPC function configuration, the system operator enters a command into the terminal 26 which causes the resource manager module 18 to execute the configuration task 127. This task 127 performs a number of operations with respect to the module 18, such as configuring each of the output ports for networks 14 and 15 according to the particular communication protocol used by that network. For this particular application, the system operator selects the configuration function for time periodic communication. This selection is entered as a command message which is communicated via link 25 to the resource manager module 18. The microprocessor 48 within the module 18 responds by sending data back to the terminal 26 which displays the data as a menu of the different parameters for the TPC function. When values have been entered for the menu parameters, the values are transmitted to the resource manager module 18 where they are stored into a configuration file within section 65 of the system RAM 50.

Figure 10:
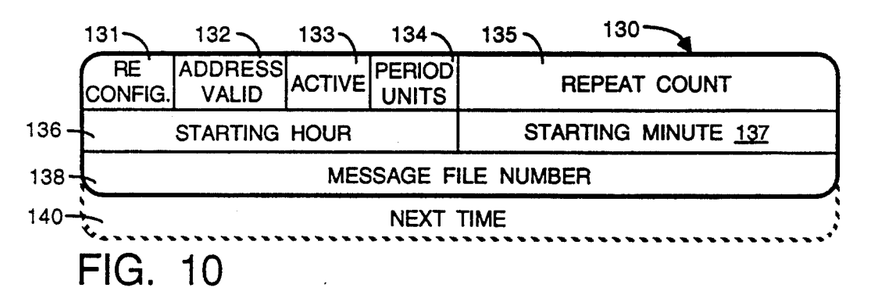
FIG. 10 depicts the structure of the configuration file for a time periodic communication function.

FIG. 10 depicts the organization of the TPC configuration file 130. A separate such file is produced for each of the TPC functions which the system operator wishes the pyramid integrator 12 to perform. The first word of this file 130 is broken down into two bytes. The first byte contains several subfields 131-134. The first field 131 contains a flag bit which indicates whether the reconfiguration has been performed which transfers the file contents into a TPC task control block in table 122. Another field 132 contains an indication as to whether the address of the message file is valid. In particular, should a message file be designated and that file does not exist, field 132 will indicate an invalid address, thus inhibiting execution of this TPC. Presently, up to eight different TPC functions may be configured in a given module. A particular configuration file that has not been configured for use is designated by a flag 133 as being inactive. As will be described, the TPC transmits a given message on a periodic basis and field 134 indicates the units of time (seconds, minutes or hours) for this period. The second byte 135 of the first word contains a numerical repeat count of how many of the period units occur between message transmissions. The two bytes 136 and 137 of the next storage word in the TPC configuration file 130 respectively define the starting hour and starting minute at which the TPC function is to commence during each day. Word 138 in the TPC file identifies a message file within the RAM 50 that defines the message to be transmitted.

Either before or immediately after configuring the TPC function, the system operator has to create a message file containing information for the TPC message. This file is identical to message files previously used with programmable controllers. The information in the message file identifies the port of the communication section to which the network network that is to carry the message is connected. The network address for the recipient station for the message also is specified in the message file.

When the TPC message sends data from the pyramid integrator 12, the message file contains the location of the data: namely the module and memory address of the first item of data. The amount of data beginning at that location that is to be sent also is designated in the message file. An indication of what the recipient station is to do with the data, e.g. the task in the recipient station that is to handle the data or a storage location in the recipient station, is also included in the message file.

When the TPC message is a command requesting another device to send data to the pyramid integrator 12, the message file contains the location of the first item of data in the data tables of the recipient station and the amount of data to be sent.

Once the module configuration file and a message file have been completed, the user via the terminal 26 commands the resource manager module 18 to reconfigure the time periodic communication functions. Such a reconfiguration also will occur upon a reset of the resource manager module 18, such as occurs during initialization after a power up or if the system clock is altered. The reconfiguration transfers the information from the configuration file 130 into a task control block in table 122 in another section of the resource manager's RAM 50. The use of a separate configuration file 130 enables a TPC function stored in the task control block to continue to be performed while the system operator is defining new values for the parameters of that TPC function. The TPC function is unaffected until the reconfiguration process transfers the information from the configuration file 130 to the task control block.

Figure 11:
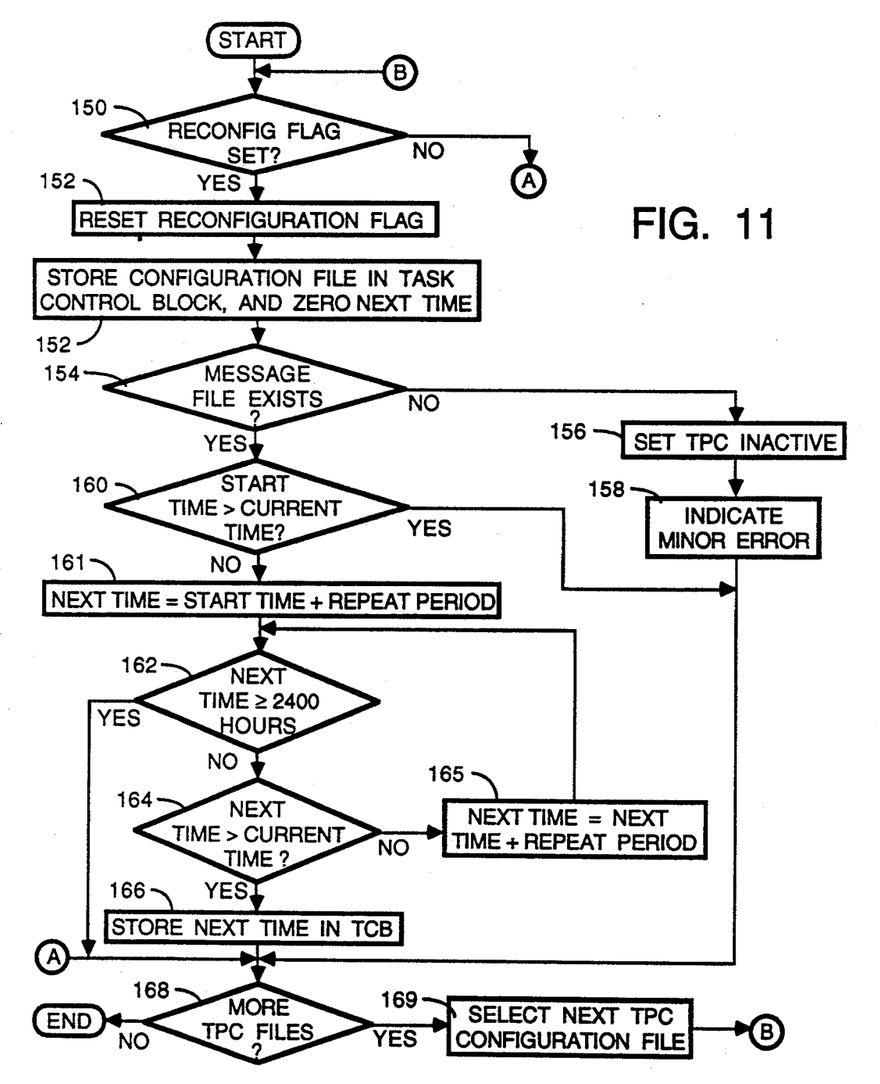
FIG. 11 is a flowchart of a routine which utilizes the data within the file of FIG. 10 to reconfigure the time periodic communication task control block within FIG. 9.

The reconfiguration routine which is executed by the microprocessor 48 is depicted by the flowchart in FIG. 11. When a reconfiguration is triggered, the reconfiguration flag 131 in the first TPC configuration file 130 is checked at step 150 to see if the file has been altered since the last reconfiguration process. If the file has been altered, the flag is reset at step 151 and the contents of a TPC configuration file 130 are transferred at step 152 into one of the task control blocks in table 122 associated with this task. The TPC task control block has the same general format as the configuration file 130 shown in FIG. 10, except for an additional entry 140 for a variable called NEXT TIME which indicates the real time when the next TPC message is to be sent, as will be described. The value of NEXT TIME is initially set to zero during reconfiguration. Then at step 154 the microprocessor 48 tries to locate the message file stored elsewhere in RAM 50 for this TPC. If the message file was not found, because the message had not been created or due to some other error, the program execution branches to step 156 where the TPC configuration file 130 is made inactive by setting the flag bit in field 133 and a similar entry is made in the task control block 122. Next at step 158, an indication is sent that a minor module error has occurred and the program execution then jumps to step 168.

If the message file for this TPC task was found at step 154, the program execution advances to step 160 where the starting time, as designated by configuration file entries 136 and 137, is compared to the current time. The current time is obtained from the real time clock within the resource manager module 18. The real time clock can be read via the backplane 30 by a communication module 22 which is performing the TPC function. If this comparison indicates that the TPC starting time will occur later in the same day that the reconfiguration is taking place, the execution of the reconfiguration routine jumps to step 168 to process another TPC configuration file 130.

Steps 162-166 in FIG. 11 insure that if the TPC task is reconfigured at a point during the day after the start time, the message will be sent at the next time during the day at which the message would have been sent if the TPC task had been configured prior to the starting time. For example, if the TPC message is to be sent every two hours commencing at 8 a.m. and the reconfiguration occurs at 1 p.m., steps 162-166 will ultimately produce a final value for NEXT TIME of 2 p.m. so that the TPC message will be sent at that time following reconfiguration.

Therefore when the reconfiguration occurs later in the day than the designated starting time, a value must be determined for the variable NEXT TIME, which indicates when to send the next TPC message. This is accomplished beginning at step 161 with the microprocessor 48 setting the value of NEXT TIME equal to the starting time plus the message repeat period. The message repeat period is determined from the period units 134 and the repeat count 135 stored in the associated TPC configuration file 130. This calculates the next point in time after the starting time at which the TPC task should send a message. This new value then is checked at step 162 to determine if the NEXT TIME has been incremented to midnight or beyond (i.e. a value equal to or greater than 2400 hours) which is not permitted. If this is the case, the reconfiguration of this TPC task terminates by jumping to step 168. If the value of NEXT TIME is before midnight, the reconfiguration advances to step 164 to check whether the value for NEXT TIME is greater than the current time, which indicates whether the NEXT TIME will occur later in the present day. If not, the value of NEXT TIME will not be greater than the value of the current time and the execution branches to step 165 where NEXT TIME is incremented by the repeat period to produce a new value for the variable. The reconfiguration loops through steps 162-165 until either the value for NEXT TIME is after the current time or has a value greater than 2400 hours.

When the value for NEXT TIME is after the current time as determined at step 164, the reconfiguration advances to step 166 where the current value of NEXT TIME is stored in entry 140 of the task control block (TCB) for this time periodic communication task. The program execution then enters step 168 where it also enters if the incrementation of the NEXT TIME exceeded 2400 hours. At step 168, a determination is made whether there is another TPC configuration file. If so the next file is selected at step 169 before the program execution returns to step 150 where the reconfiguration process is repeated for the next TPC configuration file. Otherwise the reconfiguration routine terminates.

Figure 12:
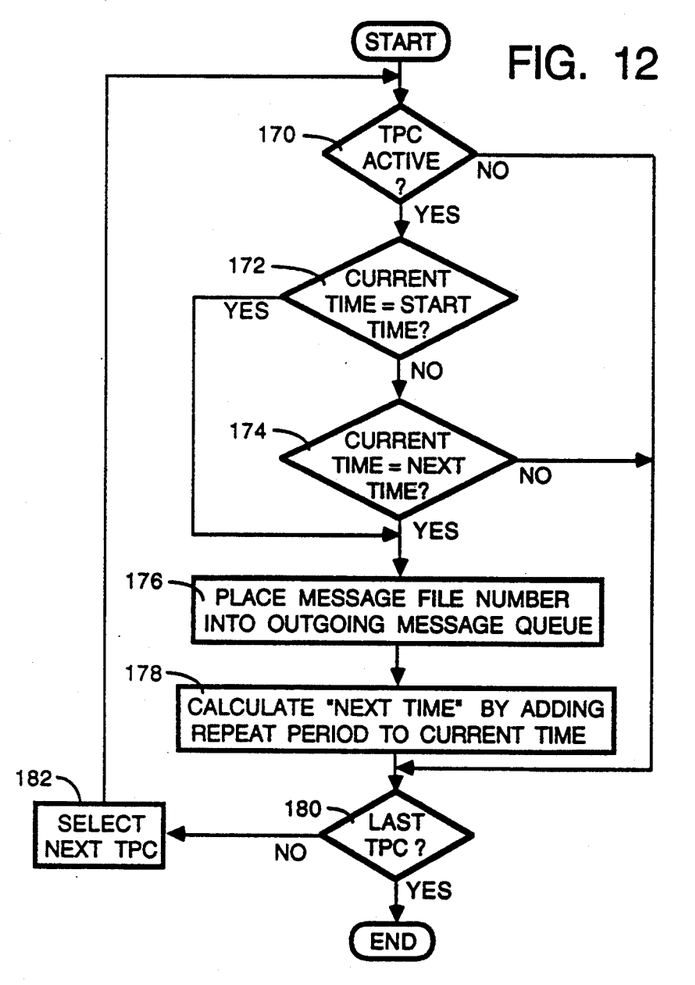

During normal operation of the pyramid integrator 12, the microprocessor 48 and the resource manager module 18 will execute the scheduler routine 120 illustrated in FIG. 8. Occasionally the scheduler will determine that the task control block priority table 122 indicates that the time periodic message task 126 should be executed. FIG. 12 represents a flowchart of the steps performed at this task which determines whether it is time to send a TPC message. This routine commences at step 170 where the task control block 122 for the first TPC is inspected to determine whether that TPC is active. Specifically, the entry in the task control block which corresponds to entry 133 in the configuration file 130 is checked to determine the active or inactive status. If the present TPC is inactive, the program execution branches to step 180 to obtain the task control block for the next TPC.

When an active status is found at step 170, the program execution advances to step 172 where the current time is compared to the start time for the present TPC. If the times are equal, a message should be sent, and the program execution branches directly to step 176. If the current time does not equal the start time, a determination is made at step 174 whether the current time equals the value of NEXT TIME stored in the task control block. The value of NEXT TIME indicates a subsequent time after the start time at which the message should be transmitted. If a message still should not be sent at this time, the program execution jumps to step 180 to access the next TPC task control block.

When it is time to send a message, step 176 will be executed at which the message file number contained within the present TPC task control block is stored in an outgoing message queue for the initiate message task 125 to handle. This type of queue and initiate message tasks were found in previous programmable controllers, such as the one described in U.S. Pat. No. 4,319,338. The initiate message task 126 uses the message file to formulate a message frame and communicate it over the respective network in the same manner as in previous systems which executed message instructions in a ladder logic control program. Briefly, the initiate message task 125 utilizes the data in the message file to formulate the appropriate message for transmission over the network. As noted previously, a TPC message can be utilized to gather data from the other programmable controllers 13 connected to the pyramid integrator 12 by network 14 or a TPC message can be utilized to send data from the pyramid integrator 12 to another device, such as the main factory computer 11 via communication network 15. Thus, the message file contains a designation of whether the message is to send a command to read from the message recipient or is to send data to the recipient. The port of the resource manager module 18 (or communication module 22) through which the message is to be sent and the network address for the recipient station also are specified in the message file. Additional data stored within the message file identifies where the data is to be obtained, either from the pyramid integrator 12 in the case of message data being transmitted by the TPC message or within the recipient of a read command. This data location information specifies the data table, a starting address within the data table, and the amount of data beginning at that address that is to be read.

Figure 13:
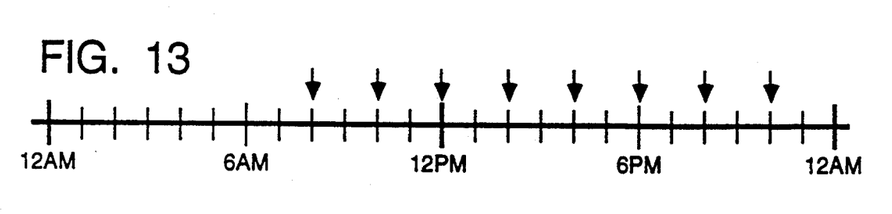
FIG. 13 is a time flowchart of the time periodic message task of FIG. 8.

After the message file has been placed into the outgoing message queue, the TPC task routine at step 178 calculates a new value for NEXT TIME by adding the value of the repeat period stored in the present TPC task control block 122. In doing this calculation, the period count and the period units stored within the task control block are employed to calculate the repeat period value to be added to the current time so as to produce a NEXT TIME value in hours, minutes and seconds. This new value is then stored into the present TPC task control block 122 in place of the previous value of NEXT TIME. This updates the task control block with a time value which indicates when the message should be sent again. It should be noted that if the new value of NEXT TIME is equal to or greater than 2400 hours, the message will not be sent until the start time occurs during the next day. At midnight, the real time clock does not read "2400", but is reset to zero. For example, if the start time is 8 a.m. with a repeat period of two hours, the message will be sent every other hour beginning at 8 a.m. as shown in FIG. 13. However, the last time that the message will be sent is 10 p.m. as the next two hour increment occurs at 12 a.m. (real time clock value zero hours). Once a new day starts, the message is not sent until the starting time occurs. Thus, the message is not being sent at 12 a.m., 2 a.m., 4 a.m. or 6 a.m. In this case, if the system operator desires that the message be sent every even numbered hour during the day, the starting time of 12 a.m. would have to be designated along with a repeat period of two hours.

The process described above utilizes a future real time as the value for NEXT TIME. The time to send a message is determined by comparing that value of NEXT TIME to the time of day indicated by the real time clock in circuit 55 of the resource manager module 18. As an alternative, a timer can be employed to determine when each repeat period occurs. In this case, the microprocessor 48 initializes a software timer with the repeat period each time that a new value for NEXT TIME otherwise would be calculated at steps 164–165 of FIG. 11 and step 178 of FIG. 12. To do so the microprocessor 48 calculates the repeat period from the repeat count 135 and the period units 134 and loads the result into the NEXT TIME entry 140 in the the TPC configuration file 130. At periodic intervals this entry 140 is decremented, as is done for other timers used by the pyramid integrator 12. In this case, the timer indicates the value of NEXT TIME in terms of time increments to next message transmission. At step 174 in this alternative, the NEXT TIME entry 140 is checked for a zero value which indicates that the timer has expired. Upon that occurrence, a message is sent at step 176.

The alternative embodiment which uses a timer must account for the system operator changing the real time clock which requires that the contents of the NEXT TIME timers for all the TPC tasks be changed accordingly. For example, when the time of day indicated by the real time clock is advanced one hour, the contents of the NEXT TIME timers must be decremented by an hour. Similarly, when the time of day indicated by the real time clock is set back one hour, the contents of the NEXT TIME timers must be incremented by an hour. This is accomplished by the microprocessor 48 detecting the alteration of the real time clock as well as the amount and direction of that alteration. This determines how the microprocessor 48 is to change the NEXT TIME timers for the TPC tasks.

As up to eight different TPC message tasks can be configured on the resource manager module 18 of each pyramid integrator 12 in FIG. 1, six of these tasks can be utilized to gather data periodically from each of the programmable controllers 13 connected to a given pyramid integrator 12. This is accomplished by sending separate TPC messages to each programmable controller 13 which messages contain a command for the programmable controller 13 to return specified data from its data tables. When the response message is received by the pyramid integrator 12, the resource manager module 18 will recognize that it is a reply to the previous TPC message and store the message data in a section within RAM 50 that has been set aside for storage of the data from that particular programmable controller 13. A separate TPC message task is configured to take all of the data gathered from the programmable controllers 13 and formulate a message which sends that data to the main factory computer 11. For example, if work shift changes occur at 6 a.m., 2 p.m. and 10 p.m., separate TPC messages can be configured to send data gathering command messages at these times to each of the programmable controllers 13. The separate TPC command which takes the gathered data and sends it to the main factory computer 11 can be configured to perform that messaging operation at some later point in time, which allows enough time for all of the programmable controllers 13 to have responded by sending their data to the pyramid integrator 12.

The TPC technique can also be utilized to send other types of commands to the programmable controllers 13, for example commands which instruct them to perform a particular operation. Thus, these operations can be coordinated to occur at specific times of day as determined by the TPC function.

The invention being claimed is:

1. In a programmable controller which has a processor module for executing a control program, an input/output module to exchange control signals with devices on a machine being controlled and a set of backplane busses which carry signals among the modules in the programmable controller; a communication module comprising:

a controller interface circuit for connecting to the set of backplane busses in order to exchange signals with another module;

a network interface circuit which sends and receives messages via a serial communication link connected to the network interface circuit;

a memory that stores a designation of a starting time, a designation of a length of a message repeat interval, and message information;

a group of data, address and control busses internal to the communication module for interconnecting said controller interface circuit, said memory, and said network interface circuit;

timing means, connected to said memory, for determining when the starting time occurs and thereafter determining each successive occurrence of expiration of the message repeat interval; and a control mechanism that responds to said timing means by causing said network interface circuit to transmit a timed periodic communication message containing the message information over the serial communication link when the timing means determines either that the starting time has occurred or that said expiration of the message repeat interval has occurred.

2. The communication module as recited in claim 1 wherein said timing means comprises:

a means for determing a time of day;

means for calculating a time at which the message repeat interval is due to expire by adding the length of the message repeat interval to the time of day to produce a value designated NEXT TIME; and means for comparing the value of NEXT TIME to the time of day which determines when the message repeat interval has expired, thereby causing the control mechanism to send the timed periodic communication message.

3. The communication module as recited in claim 1 further comprising:
a programming device by which the user of the programmable controller enters configuration values for the designation of a configuration starting time, and the designation of a configuration length of a message repeat interval; and
an interface for connecting said programming device to said internal communication module busses, thereby enabling the transfer of the configuration values from the programming device to the communication module, wherein the configuration starting time and the configuration length of the message repeat interval are used in the communication module to establish the starting time and the length of the message repeat interval, respectively, which are stored in said memory.

4. The communication module as recited in claim 3 wherein said memory comprises:
a task control block having a set of storage locations containing the designation of the starting time, and the designation of the length of the message repeat interval; and
a configuration file having a group of storage locations for containing the configuration values received from said programming device.

5. The communication module as recited in claim 4 further comprising a mechanism for translating the configuration values from the configuration file into an updated starting time and an updated length of the message repeat interval, and storing the updated starting time and the updated length of the message repeat interval as the starting time and length of the message repeat interval, respectively, in the task control block in response to a command from said programming device.

6. The communication module as recited in claim 1 wherein said memory stores a message file containing the message information; and said memory further stores a task control block with a set of storage locations containing the designation of the starting time, the designation of the length of the message repeat interval, and an identification of the message file.

* * * * *